Dec. 4, 1923.  1,476,278

C. H. AYARS

CAN FILLING MACHINE

Filed Feb. 27, 1923  2 Sheets-Sheet 1

INVENTOR
Charles H. Ayars
BY Joshua R. H. Potts
His ATTORNEY

Dec. 4, 1923.

C. H. AYARS

CAN FILLING MACHINE

Filed Feb. 27, 1923

1,476,278

2 Sheets-Sheet 2

INVENTOR
Charles H. Ayars
BY Joshua R. H. Potts
His ATTORNEY

Patented Dec. 4, 1923.

1,476,278

UNITED STATES PATENT OFFICE.

CHARLES H. AYARS, OF SALEM, NEW JERSEY, ASSIGNOR TO AYARS MACHINE COMPANY, OF SALEM, NEW JERSEY.

CAN-FILLING MACHINE.

Application filed February 27, 1923. Serial No. 621,528.

*To all whom it may concern:*

Be it known that I, CHARLES H. AYARS, a citizen of the United States, residing at Salem, in the county of Salem and State of New Jersey, have invented certain new and useful Improvements in Can-Filling Machines, of which the following is a specification.

My invention relates to can filling machines and more particularly to machines used for canning tomatoes or other comparatively bulky fruits or vegetables.

In canning such materials, tomatoes for instance, one lot is likely to be comparatively soft and another lot comparatively hard. With those which are comparatively soft it is a comparatively easy matter to feed the required number to the measuring receptacle, but greater pressure is required to crowd the required quantity of harder specimens into a measuring receptacle of like capacity.

The objects of my invention are to provide means whereby the receiving capacity of the measuring receptacle may be increased to receive the materials and automatically restored to its normal capacity as the measuring receptacle travels toward the discharge thereby compressing the materials, and to provide means whereby the receiving capacity of the measuring wheel may be varied at the will of the operator without disturbing the usual capacity adjustment of the measuring receptacles.

These objects, and other advantageous ends which will be described hereinafter, I attain in the following manner, reference being had to the accompanying drawings in which—

Figure 2:
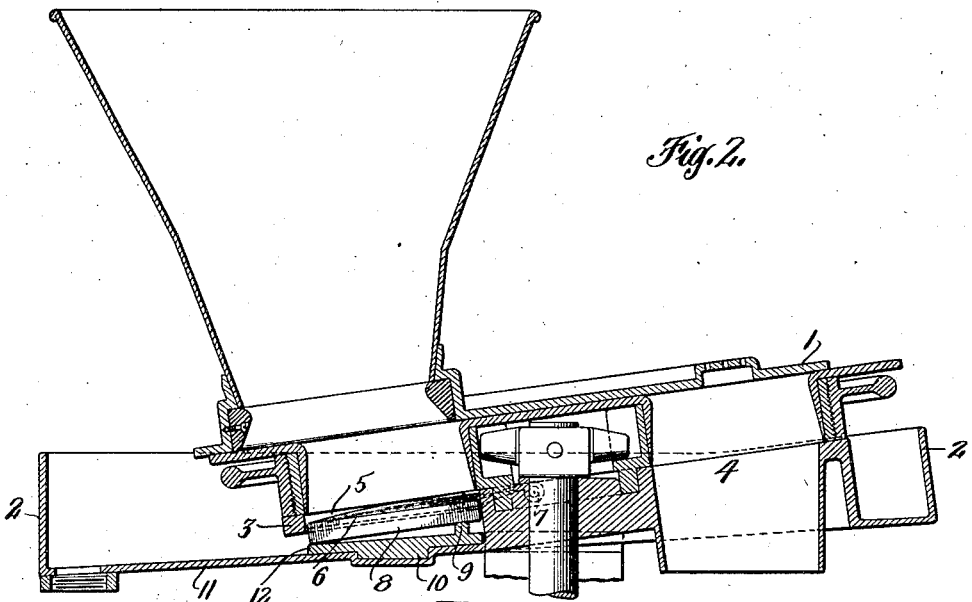
Figure 1:
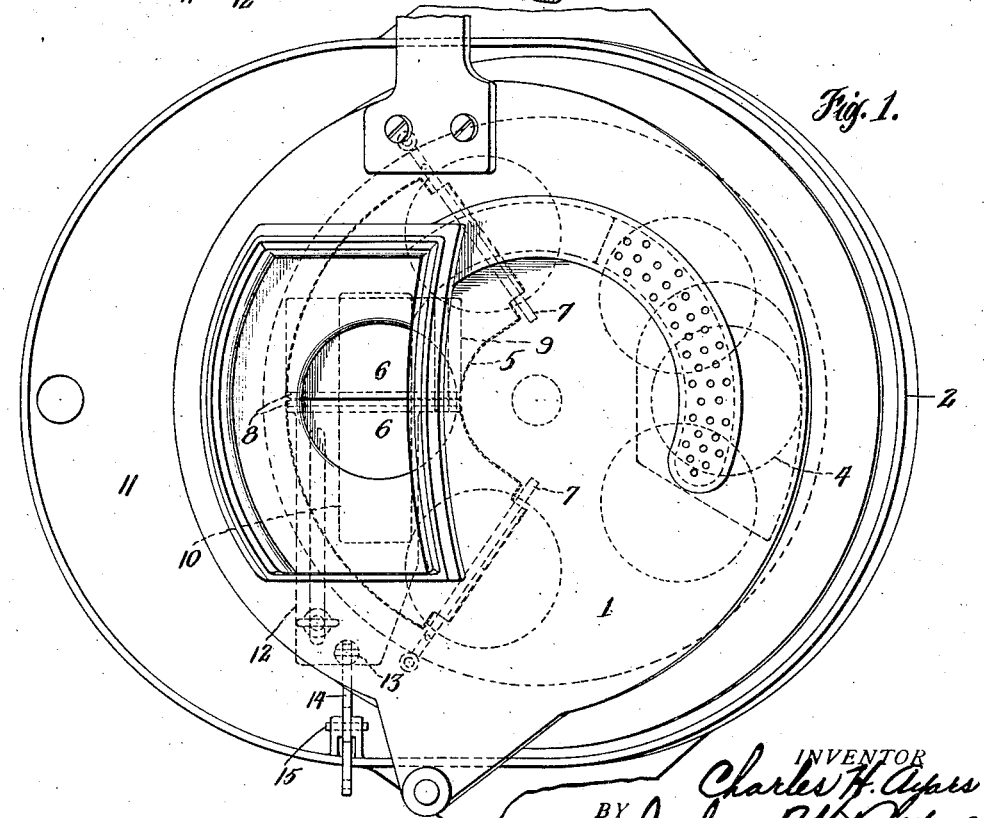
Figure 4:
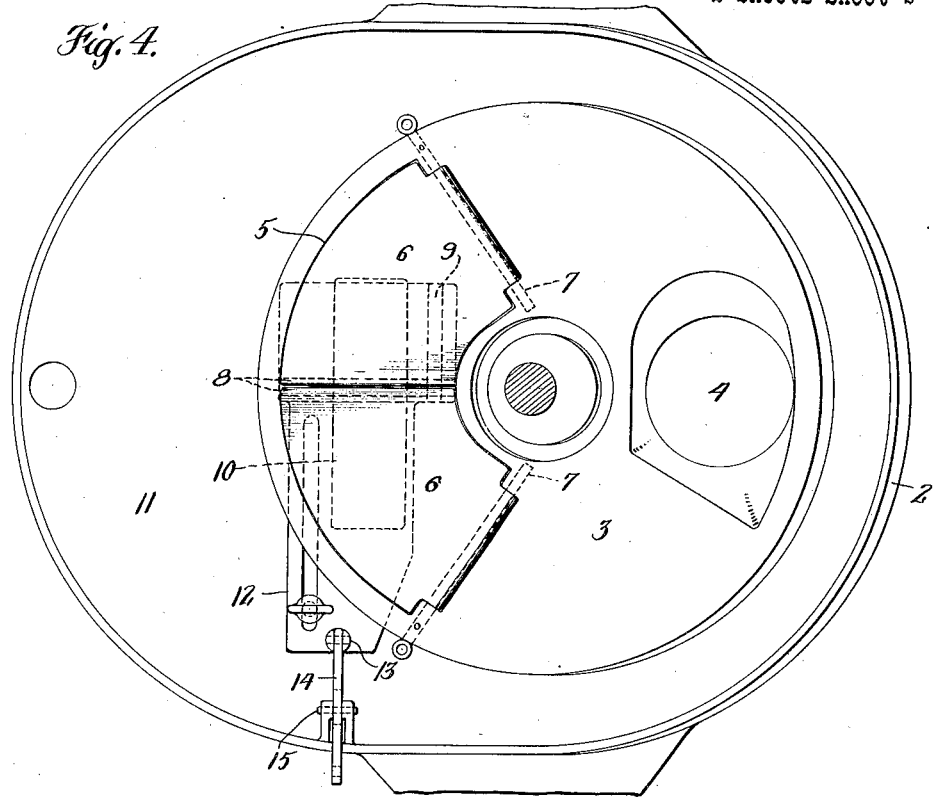
Figure 3:
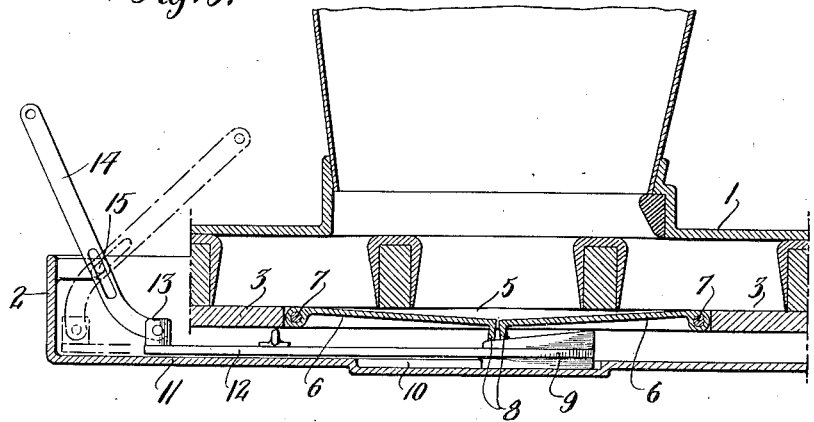

Figure 1 is a plan view of the turret of a canning machine embodying my invention, Figure 2 a fragmentary sectional view of the turret, Figure 3 a fragmentary developed sectional view of the hopper and turret, and Figure 4 a plan view of the machine.

Referring to the drawings, 1 indicates the hopper plate of a canning machine, 2 the drip pan and 3 the bed plate. The bed plate has the usual discharge opening 4 and another opening 5 beneath the hopper and corresponding in shape with the throat of the hopper. Within this opening I mount two plates 6, hereinafter called compression plates, each connected to the bed plate at one end of the opening by a hinge pin 7, and the area of the two plates being just sufficient to fill the opening. At their meeting ends each of the plates has a downwardly extending flange 8 adapted to engage with the sloping surface of a wedge block 9 mounted to slide, transversely to flanges 8, in a channel 10 formed in the upper surface of bottom plate 11 of the turret. A plate 12, shown as integral with the wedge block, carries a pivot post 13 to which a slotted lever 14 is pivotally connected. Lever 14 is fulcrumed on a fixed pin 15 and, by manipulating the lever, the wedge block may be moved in or out to lower or raise the meeting ends of compression plates.

In the usual construction the bed plate constitutes the lower wall of the measuring receptacle. With my invention the hinged plates serve as the lower wall while the receptacle is being filled. With the wedge block in its out position the compression plates will be flush with the surface of the bed plate and the operation will be as usual. If harder material is to be fed the wedge block may be moved inwardly thus leaving the plates inclined as shown in Figure 2 and thereby increasing the receiving capacity of the measuring receptacle. As the outer walls of the measuring receptacle continue their travel the material is forced up the incline against the hopper plate and the receptacle charged with the proper quantity of material to be delivered to the can.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. The combination, in a canning machine, of a bed plate having an opening beneath the hopper throat with a compression plate adjustably mounted in the opening.

2. The combination, in a canning machine, of a bed plate having an opening beneath the hopper throat with a pair of compression plates, disposed in the opening, and means for adjusting the inclination of the plates.

3. The combination, in a canning machine, of a bed plate having an opening beneath the hopper throat with a pair of compression plates, disposed in the opening and hinged to the bed plate, and means for adjusting the inclination of the plates.

4. The combination, in a canning machine, of a bed plate having an opening beneath the hopper throat with a pair of compression plates, disposed in the opening and hinged to the bed plate; a wedge block disposed beneath the meeting edges of the compression plates, and means for actuating the wedge block to adjust the inclination of the plates.

In testimony whereof I have signed my name to this specification in the presence of two subscribing witnesses.

CHARLES H. AYARS.

Witnesses:
CHAS. E. POTTS,
ELIZABETH GARBE.